Feb. 19, 1957   H. F. GERWIG   2,781,782
VALVE CONTROL LINKAGE
Filed Dec. 10, 1952
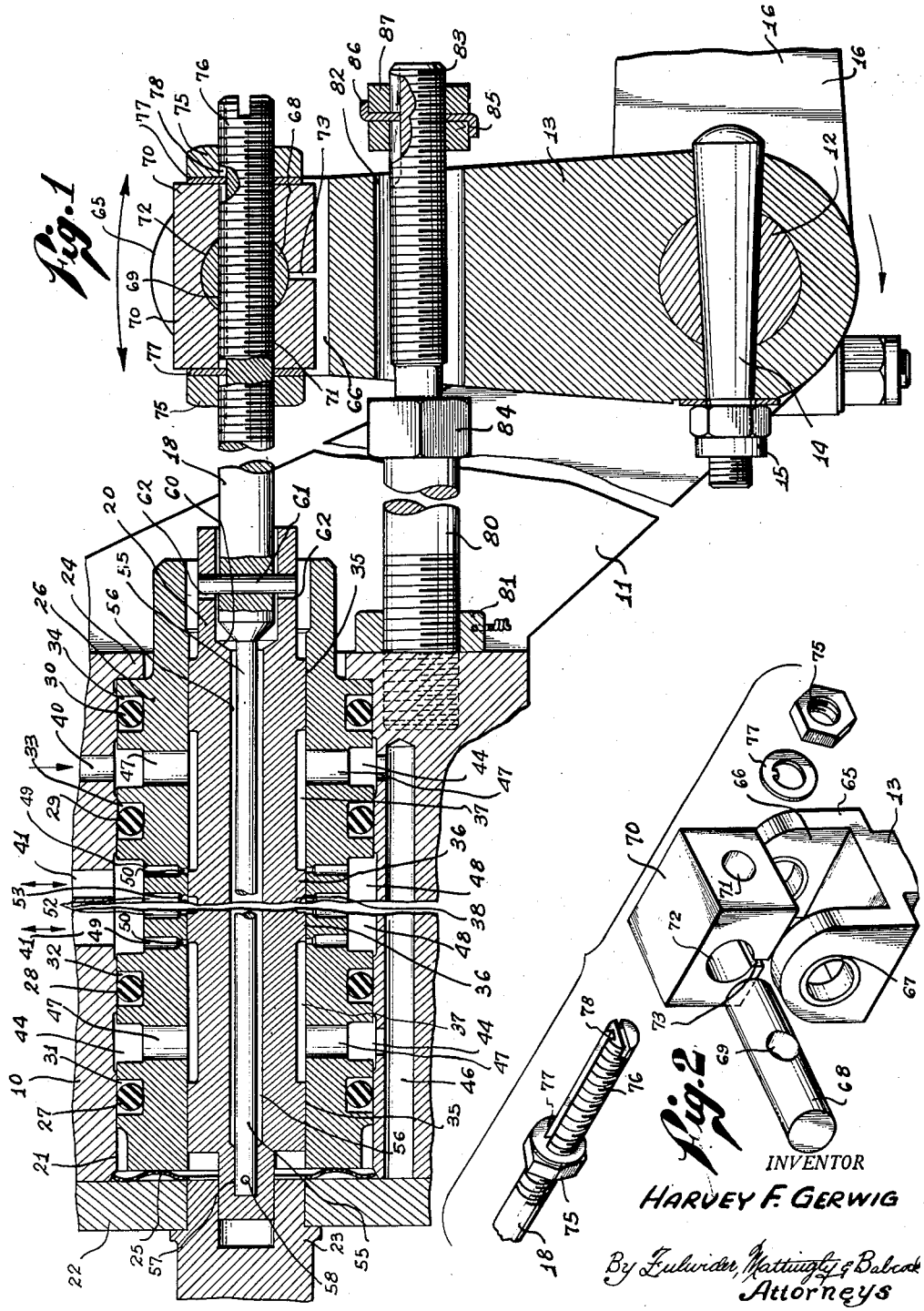
INVENTOR
HARVEY F. GERWIG
By Zulurider, Mattingly & Babcock
Attorneys

United States Patent Office 2,781,782
Patented Feb. 19, 1957

2,781,782

VALVE CONTROL LINKAGE

Harvey F. Gerwig, Glendale, Calif., assignor to Weston Hydraulics, Limited, North Hollywood, Calif., a corporation of California Application December 10, 1952, Serial No. 325,121

8 Claims. (Cl. 137—622)

This invention relates generally to slide valves, and more particularly to a linkage mechanism for mechanically connecting a valve shuttle or spool with a pivotally movable actuating arm.

The linkage is particularly advantageous for use in hydraulic control valves having closely fitted moving parts which must be accurately moved to provide sensitive valve response characteristics. An embodiment of the invention designed for use with a hydraulic control valve of this type will hereinafter be described, but it is to be understood that the invention may be used beneficially in many other installations which will be apparent to those skilled in the art.

One example of a hydraulic system requiring sensitive control valves is a system installed in modern aircraft for moving the control surfaces thereof. Generally, these systems operate under high fluid pressure and require a close fit between the relatively movable valve members for pressure sealing. Hence, the typical control valve employs a valve shuttle or spool which is fitted tightly within the valve body and is designed to have a very short travel or endwise movement for effecting the desired changes in fluid flow. This makes it highly important to couple the manual controls to the valve shuttle by a linkage free from end play so that there will be no "dead spot" or time lag in the operation of the valve, and to provide hydraulic stability. It also becomes important to provide a linkage which exerts a substantially linear end thrust on the shuttle to avoid binding side pressure.

From the foregoing it can be realized that the conventional types of linkages used for translating oscillating motion to linear reciprocating motion will not be satisfactory. A completely rigid connection to the oscillating member is not feasible because the slidable valve shuttle cannot be moved laterally and a high side pressure would be exerted on the shuttle. On the other hand, if the linkage is made flexible through the use of ball joints or flexible cables, end play will result so that there will not be exact follow up by the shuttle. Accordingly it is necessary that the linkage be longitudinally rigid and at the same time laterally flexible.

Another problem arising from the use of a closely fitted shuttle is the tendency of the shuttle to dig into and score the walls of the cylinder in which it is mounted. After the cylinder wall has become scored, the shuttle no longer slides freely and the unit is not properly responsive as a control device. To insure against such scoring it is advantageous to pull the shuttle from the leading end and avoid the tendency of the shuttle to cock and exert a lateral binding force upon the cylinder walls such as would be caused by a pushing force.

It therefore becomes highly desirable to connect the valve shuttle to the control linkage in such a manner that the point of connection to the shuttle shifts from one end to the other end upon a directional reversal of the actuating force. In other words, the shuttle is pulled through both of the alternate opposed strokes of a reciprocating linear motion. Of course, this result must be accomplished without the introduction of end play.

Bearing in mind the aforementioned problems, it is a major object of the invention to provide a control linkage for translating an oscillating actuating motion into a linear reciprocating motion without introducing end play therein.

Another object of the invention is to provide a control linkage having a longitudinally rigid and laterally flexible spindle therein which reduces the side pressure exerted against the valve shuttle.

It is also an object of the invention to provide a control linkage connected to a slidable shuttle in such a manner as to pull the shuttle from the leading end through opposed strokes of a reciprocating motion.

A further object of the invention is to provide a control linkage having a maximum effective connecting rod length to minimize the effect of the lateral component of the actuating force.

Still another object of the invention is to provide a control linkage having an easily adjustable and yet tight rotatable mounting on the actuating arm.

A still further object of the invention is to provide a control linkage having compact and easily adjustable stop means therein for limiting the shuttle travel.

The foregoing and other objects and advantages of the invention will become apparent from the following detailed description of a preferred embodiment thereof, and from an inspection of the accompanying drawing, in which:

Fig. 1 is a longitudinal medial section through a valve showing the installation of a preferred embodiment of the valve control mechanism; and Fig. 2 is an exploded view of the adjustable connecting rod mounting on the actuating arm.

Referring now to Fig. 1 of the drawings, a preferred embodiment of the control mechanism is shown connected to operate a typical aircraft control valve formed with a housing or body indicated by the numeral 10. A rigid bracket 11 extends outwardly from body 10 to rotatably support a lower pivot shaft 12 which extends horizontally through suitable journal bearings. Shaft 12 carries an upper actuating arm 13 which is secured for rotation with the shaft by a tapered pin 14 and lock nut 15. Also secured to shaft 12 is a drive link 16 that is adapted to be connected to a conventional thrust rod linkage leading to the pilot's manual control lever. The elements connecting link 16 with the manual control are well known in the art, and need not be described herein, their purpose being to transmit an actuating force causing pivotal movement of link 16 and shaft 12.

Rotation of shaft 12 causes the upper end of arm 13 to travel along an arc centered on the shaft axis, as is indicated by the upper directional arrows. As can be appreciated, the movement of a reference point on arm 13 is substantially horizontal through a limited sector about a vertical axis, but has some up and down motion because of the arcuate path traveled. A connecting rod 18 is rotatably connected to the upper end of arm 13 and to a shuttle or spool 20 which slides horizontally along the longitudinal axis of valve housing 10. Because of the inherent up and down motion of arm 13, and possible side motion due to eccentricity with respect to the axis of housing 10, it can be seen that if connecting rod 18 is rigidly connected to the shuttle a lateral pressure may be exerted on the shuttle which will cause it to bind frictionally within the housing. Therefore it is necessary that a laterally flexible connecting means be interposed between shuttle 20 and rod 18 as will later be described.

Within housing 10 is a cylindrical valve chamber 21 that is closed at the left-hand or inner end by a cover plate 22 and a cap fitting 23. The other end of chamber 21 opens outwardly past an internal housing flange 24 formed on the outer end wall thereof. A ported liner or sleeve 26 is fitted within chamber 21 and is held against axial movement between flange 24 and a spring diaphragm 25 bearing against cover 22. Sleeve 26 is sealed tightly against the wall of chamber 21 by a series of O-rings 27 to 30 which are fitted within spaced annular grooves 31 to 34, respectively, so as to prevent any fluid leakage along the length of the sleeve.

The interior of sleeve 26 is highly finished as by honing or lapping, and slidably receives shuttle 20 which is also highly finished so as to have a tight sealing fit therein. Shuttle 20 is flanged externally to provide raised end lands 35 and a pair of spaced intermediate lands 36 which seat slidably against the wall of sleeve 26. Between each end land 35 and the adjacent intermediate land 36, shuttle 20 is of reduced diameter to define with the sleeve wall a narrow annular cavity 37 of substantial length. A similar central cavity 38 is defined by the wall of sleeve 26, and a reduced portion of the shuttle 20 extending between lands 36. Only the end portions of cavity 38 are seen in the centrally broken away view of Fig. 1.

The valving arrangement existing within housing 10 is merely illustrative of a type of four-way control valve commonly used in aircraft hydraulic systems, and in and of itself forms no part of the invention. However, in order to fully appreciate the advantages of the control linkage, it is desirable to consider briefly the operation of shuttle 20 within the valve. An inlet port 40 connected externally to a high-pressure fluid source extends downwardly through body 10 into the upper and outboard end of valve chamber 21. A similar return port (not shown) is connected externally to a system return line and extends downwardly through the broken away central portion of body 10 into chamber 21. Cylinder or power ports 41 extend downwardly through body 10 on either side of the last-mentioned return port, and likewise communicate into chamber 21. Ports 41 are typically respectively connected to the ends of a hydraulic fluid motor, e. g. cylinder and piston, for effecting operation thereof. Flow through cylinder ports 41 is selectively controlled through the movement of shuttle 20 which interconnects one or the other of these parts with the inlet port 40.

Sleeve 26 is formed with external annular passageways 44 near the opposite ends thereof, with the passageway at the outer end being aligned with inlet port 40 to receive fluid therefrom. A horizontal bore 46 extends through body 10 below sleeve 26 and interconnects both passageways 44 so that the fluid under pressure entering from inlet port 40 is at all times communicated to both ends of the sleeve. The fluid is then directed inwardly through a plurality of radially extending ports 47 which open through the bottoms of passageways 44 into the interior of sleeve 26. Ports 47 are so located as to lead into the previously-mentioned cavities 37 formed around shuttle 20.

A second pair of annular passageways 48 are formed externally on sleeve 26 in alignment with cylinder ports 41 and are selectively connected to the corresponding cavities 37 through a plurality of small control ports 49 extending radially inwardly from the bottom of each of the passageways. At the inner end of each control port 49 is a reduced orifice opening 50 which may be closed by the adjacent shuttle land 36 or opened into the corresponding cavity 37. With shuttle 20 in the central or neutral position as illustrated in Fig. 1, all of the orifices 50 are approximately half covered by lands 36 and half open into the associated cavity 37. Also opening inwardly to the bottom of each annular passageway 48 are a plurality of radially directed discharge ports 52 which are adapted to selectively communicate with central cavity 38 through inner reduced orifices 53. Again considering shuttle 20 in the neutral position, orifices 53 are half covered by lands 36 and half open to cavity 38.

Thus with shuttle 20 in the neutral position, both passageways 48 are partially connected to the source of high-pressure fluid through inlet 40, and are at the same time open to the system drain through cavity 38. Equal pressure is therefore exerted through cylinder ports 41, and no movement of the fluid motor connected thereon takes place. However, when shuttle 20 is moved a slight distance in either direction, one set of control orifices 50 becomes completely blocked and the other completely open. At the same time, the adjacent sets of discharge orifices 53 are respectively opened and closed. The pressures within cylinder ports 41 are then unbalanced, and fluid flows outwardly through one of the ports to cause actuation of the fluid motor. The other port 41 acts as a discharge port to receive fluid drained back from the motor. As can be appreciated, when shuttle 20 is moved in the opposite direction, a reversal of flow occurs and the fluid motor is caused to move in the opposite direction. Therefore, it can be seen that the total travel of shuttle 20 is very small, and that it is highly important to accurately control the motion thereof.

Keeping in mind the importance of preventing end play in the control linkage, it should also be remembered that shuttle 20 is fitted quite tightly within sleeve 26 and will bind quite easily if a side pressure is exerted thereon. Accordingly, both of these problems must be overcome in the design of the coupling means interconnecting shuttle 20 and connecting rod 18. To this end, a longitudinally rigid and laterally flexible coupling spindle is provided, as will now be described.

An elongated spindle or stem 55 is formed on the inner end of connecting rod 18 to extend concentrically through a somewhat larger axial bore 56 in shuttle 20. At the inner end of shuttle 20, bore 56 is reduced to provide a socket 57 which engages tightly around the end of spindle 55, and is brazed or welded integrally thereon. A horizontal connecting pin 58 may also be driven through spindle 55 and shuttle 20 for additional strength. Spindle 55 is of considerable length, and is comparatively slender so that the outer end thereof may flex within bore 56 while the inner end is held rigidly in position by socket 57. As can be understood, by flexing up and down the driving axis of spindle 55 is shifted out of the horizontal plane to compensate for the up and down motion of connecting rod 18. Spindle 55 may also flex slightly from side to side so as to compensate for any side movement of connecting rod 18. Thus substantially no lateral pressure is exerted on shuttle 20 to bind it within sleeve 26. At the same time, shuttle 20 and connecting rod 18 form a longitudinally rigid unit without end play therein.

As thus far described, it can be seen that the linkage by reason of its flexibility is capable of translating the motion of arm 13 into a linear reciprocating motion. However, if the moving force is applied in a direction to push rather than pull shuttle 20, there will be a tendency for the shuttle to cock within sleeve 26 so that the leading end digs into and scores the sleeve wall. Therefore, it is an object of the invention to pull shuttle 20 from the leading end while traveling either inwardly or outwardly.

For this purpose, the outer end of bore 56 is enlarged to provide a recessed seat 60 which surrounds the end of connecting rod 18 and has a small clearance therewith. A pin 61 is driven vertically through rod 18 and projects outwardly to enter slidably within enlarged openings 62 formed in the upper and lower walls of shuttle 20. Pin 61 may move either up and down or from side to side within openings 62 to permit the lateral flexing movement of spindle 55. However, in the assembly of the device pin 61 is initially offset to bear against the right hand or outer end of openings 62 and provide a substantial clearance at the inner end of the openings.

When shuttle 20 moves to the left or inwardly within sleeve 26, it is pulled from the leading end through the connection of spindle 55 within socket 57. Because of the inward clearance of pins 61 within openings 62 there is no tendency to push shuttle 20 from this point. However, if shuttle 20 should be moved in the opposite direction through the connection of spindle 55 and socket 57, it can be seen that the shuttle would be pushed rather than pulled with a tendency for the leading end to exert lateral pressure such as to score the wall of sleeve 26.

Because the arrangement of pin 61 and opening 62 is such that the pin fits tightly against the outer end of the opening, outward movement of connecting rod 18 is transmitted directly to the leading end of shuttle 20 and again the force is a pulling rather than a pushing force. Thus the tendency of shuttle 20 to cock and bind against the wall of sleeve 26 is avoided through either stroke of the reciprocating motion.

In order to make connecting rod 18 longitudinally adjustable with respect to arm 13, adjustable mounting means are provided for cooperative assembly with the arm. As is best seen in Fig. 2, the upper end of arm 13 is provided with a fork or clevis 65 having a rectangular slot 66 extending longitudinally therethrough. Each side of fork 65 carries a journal bearing 67 adapted to rotatably support a trunnion shaft 68 which extends horizontally across slot 66. Shaft 68 is itself bored centrally to provide an opening 69 through which the end of rod 18 may be passed. A rectangular clamping block 70 is adapted to fit freely within clevis 65 and has a longitduinal bore 71 to receive the end of rod 18, together with a transversely intersecting bore 72 that takes trunnion 68. On the lower side wall of block 70 a gap or slot 73 having spaced opposing faces is extended parallel to the axis of bore 72 so that the block may be clamped tightly around trunnion 68 when pressure is exerted inwardly against the ends thereof. It should also be noted that when engaged on rod 18, the block 70 is spaced above the bottom of clevis 65, as is best seen in Fig. 1, so that the block may remain substantially horizontal as actuating arm 13 pivots.

At either end of block 70, lock nuts 75 are threadedly engaged on a threaded end portion 76 formed on rod 18. Splined lock washers 77 are mounted inwardly of lock nuts 75 and seated within a longitudinal groove or keyway 78 in end portion 76. After the proper position of rod 18 relative to arm 13 is determined, lock nuts 75 are tigtened inwardly so that the opposing faces of slot 73 are drawn together and block 70 is clamped firmly around trunnion 68, thus joining the rod and trunnion together as a solid unit without end play therein.

To complete the linkage, stop means are provided for limiting the travel of arm 13. A stud 80 is threadedly engaged in housing 10 and adjustably locked thereto by a lock nut 81. The outer end of stud 80 projects outwardly through an opening 82 formed in arm 13, and is provided with a threaded end portion 83. Between housing 10 and arm 13 stud 80 carries an enlarged stop collar 84 which limits the inward travel of arm 13. Outward travel of arm 13 is limited by a stop nut 85 engaged on the threaded stud portion 83. A splined lock washer 86 and a jam nut 87 back nut 85 to hold the latter in position. As can be appreciated, both the amount of travel of arm 13 and the angular limits thereof can be easily and independently adjusted by the stop means thus shown.

While the herein-described preferred embodiment of the invention is fully capable of carrying out the aforementioned objects and advantages, modifications of design and construction will be apparent to those skilled in the art. Therefore, I do not wish to be limited to the details herein, except as defined in the appended claims.

I claim:

1. A valve control mechanism which includes: a shuttle mounted for in and out sliding movement within a valve housing, said shuttle having an axial bore extended therealong with a reduced socket at the inner end thereof and an enlarged seat at the outer end thereof; a movable connecting rod adapted for pivotal attachment to an actuating arm extending in spaced relationship within said shuttle seat; a flexible spindle formed integrally with said rod and extended through said bore in spaced concentric relationship, with the inner end secured rigidly in said socket for transmitting inward movement to said shuttle, said spindle flexing transversely within said bore in accordance with the movement of said rod, whereby to reduce the side pressure on said shuttle while providing a solid connection between said shuttle and said rod; and means connecting the outer end of said shuttle and said rod, said means including a pin driven through said rod and enlarged openings formed in the wall of said seat to receive said pin and allow said rod to move transversely within said seat, said pin having limited freedom of movement inwardly along the axis of said shuttle in said openings upon inward movement of said rod, and bearing tightly against the outer end walls of said openings upon outward movement of said rod whereby to transmit outward movement to said shuttle from said rod.

2. In a valve mechanism of the type having a casing, a shuttle movable therein to control fluid flow through the valve and means to move the shuttle; the combination comprising a longitudinally movable shuttle, rod means movable to effect shuttle movement, first means rigidly connecting one portion of said rod means to one portion of said shuttle, and second means connecting a second portion of said rod means to a second portion of said shuttle spaced from said first portion of said shuttle, said second means including lost motion means constructed and arranged to effect immediate corresponding movement of said shuttle upon movement of said rod in one direction and to permit relative movement of said second portions of said shuttle and rod upon movement of said rod in a direction opposite to said one direction.

3. In a valve mechanism of the type having a casing, a shuttle therein movable to control fluid flow through the valve and means to move the shuttle; the combination comprising a shuttle longitudinally movable in the casing, rod means movable to effect shuttle movement, first means rigidly connecting one portion of said rod means to one portion of said shuttle, and second means connecting a second portion of said rod means spaced from said first rod portion to a second portion of said shuttle spaced from said first shuttle portion, said second means including lost motion means constructed and arranged to effect immediate corresponding movement of said shuttle upon movement of said rod in one direction and to permit relative movement of said second portions of said shuttle and rod upon movement of said rod in a direction opposite said one direction.

4. In a valve mechanism of the type having a casing, a shuttle movable therein to control fluid flow through the valve and means to move the shuttle; the combination comprising a longitudinally movable shuttle, longitudinally rigid and laterally flexible rod means movable to effect shuttle movement, first means rigidly connecting one portion of said rod means to one portion of said shuttle, and second means connecting a second portion of said rod means to a second portion of said shuttle, said second means including lost motion means constructed and arranged to effect immediate corresponding movement of said shuttle upon movement of said rod in one direction and to permit relative movement of said second portions of said shuttle and rod upon movement of said rod in a direction opposite said one direction.

5. In a valve mechanism of the type having a casing, a shuttle movable therein to control fluid flow through the valve and means to move the shuttle; the combination comprising a longitudinally movable shuttle having means defining a longitudinally extending opening therein, longitudinally rigid and laterally flexible rod means including a portion thereof disposed within said shuttle opening movable to effect shuttle movement, first means rigidly connecting a first end portion of said rod means to a first end portion of said shuttle, and second means connecting a second portion of said rod means to the opposite end portion of said shuttle, said second means including lost motion means constructed and arranged to effect immediate corresponding movement of said shuttle upon movement of said rod in a direction toward said first end portion of said shuttle and to permit movement of said second portion of said rod relative to said opposite end portion of said shuttle upon movement of said rod in the opposite direction.

6. In a valve mechanism of the type having a casing, a shuttle therein movable to control fluid flow through the valve and means to move the shuttle; the combination comprising a longitudinally movable shuttle, longitudinally rigid and laterally flexible rod means movable to effect shuttle movement, first means rigidly connecting the innermost portion of said rod means to an inner portion of said shuttle, means defining a transversely extending opening in said shuttle, means rigid with said rod disposed within said opening and in engagement with said means defining the outermost side of said opening, said means rigid with said rod being constructed and arranged to be smaller than the opening defined by said opening defining means whereby movement of said rod in a direction away from said inner shuttle portion results in immediate corresponding movement of said shuttle and movement of said rod in the opposite direction can result in relative movement between said means rigid with said rod and said opening defining means.

7. In a valve control mechanism of the type which includes a shuttle mounted within a valve housing having an aperture at one end for sliding movement therein toward and away from the housing aperture, rod means extending through the housing aperture adapted to effect the movement of said shuttle, means rigidly securing one portion of said rod means to one end of said shuttle spaced from the housing aperture for transmitting movement thereto in one direction, and pin and slot defining means connecting the opposite end of said shuttle and said rod means, said pin means having a limited freedom of movement in said slot defining means toward said one shuttle end and held against opposite movement by said slot defining means whereby to transmit opposite movement to said shuttle from said rod means.

8. In a valve control mechanism of the type which includes a shuttle mounted within a valve housing having an aperture at one end for sliding movement therein toward and away from the housing aperture, rod means extending through the housing aperture adapted to effect the movement of said shuttle, said rod means including a portion extending through said shuttle and attached rigidly to the one end thereof, pin means carried rigidly by said rod means, opening defining means in said shuttle receiving said pin means, said pin being guided in said opening defining means for limited movement in one direction and being held against movement in the opposite direction whereby to transmit movement directly in the opposite direction to said shuttle from said rod means.

References Cited in the file of this patent

UNITED STATES PATENTS

| | | |
|---|---|---|
| 545,648 | Hasbrouck | Sept. 3, 1895 |
| 1,057,554 | Jacobs | Apr. 1, 1913 |
| 1,198,093 | Williams | Sept. 12, 1916 |
| 1,886,007 | Goldberg | Nov. 1, 1932 |
| 2,209,418 | Overbeke | July 30, 1940 |
| 2,428,086 | Leighton | Sept. 30, 1947 |
| 2,569,766 | Klein et al. | Oct. 2, 1951 |
| 2,573,549 | Danly et al. | Oct. 30, 1951 |

FOREIGN PATENTS

| | | |
|---|---|---|
| 755,464 | France | Sept. 11, 1933 |